June 24, 1969  R. A. BAUER  3,452,312
GRAVITY SENSITIVE ELECTRIC SWITCH
Filed Nov. 16, 1967
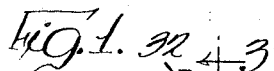
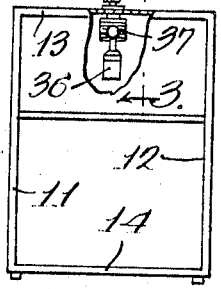
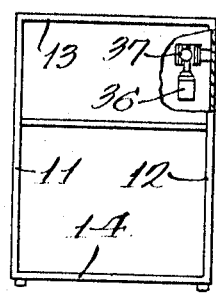
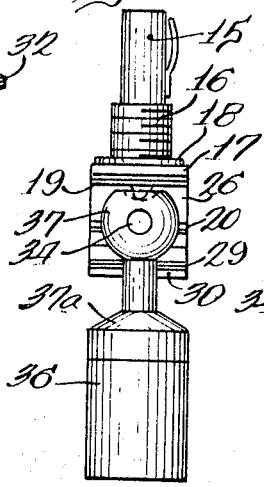
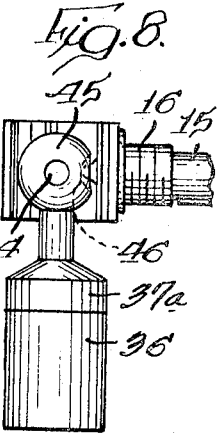
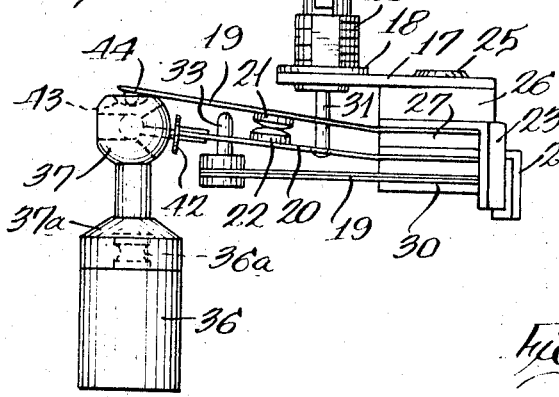
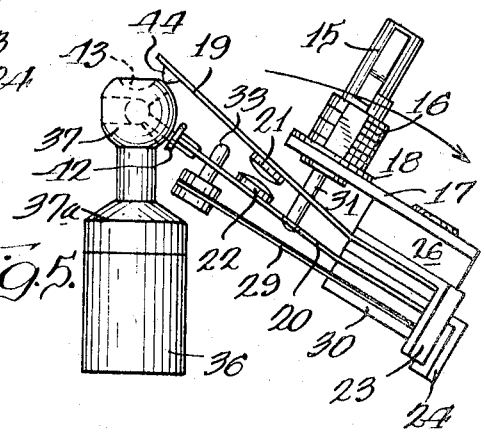
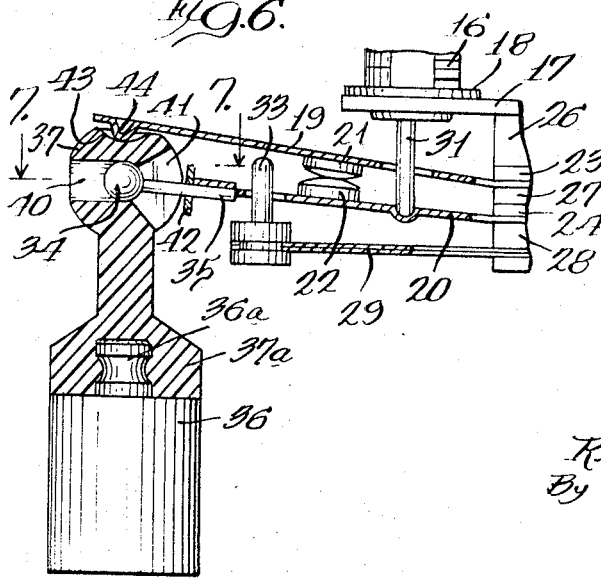
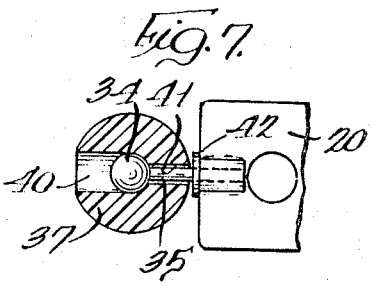
Inventor:
Richard A. Bauer
By Stanley Woods
Atty

United States Patent Office 3,452,312
Patented June 24, 1969

3,452,312
GRAVITY SENSITIVE ELECTRIC SWITCH
Richard A. Bauer, Morris, Ill., assignor to Arm, Inc., Morris, Ill., a corporation of Delaware
Filed Nov. 16, 1967, Ser. No. 683,628
Int. Cl. H01h 37/00, 61/00, 37/52
U.S. Cl. 337—12                                  10 Claims

ABSTRACT OF THE DISCLOSURE

A switch assembly having a pivoting gravity sensitive actuating means which causes the circuit through an appliance to become interrupted when the applicance occupies an abnormal or tipped over position.

---

This invention relates to a switch assembly and more particularly to a switch of the type having a gravity sensitive actuating means which in response to a condition wherein the electrically operated appliance with which the switch is associated occupies an abnormal or tipped over position, the actuating means will cause the circuit flowing through the appliance to become interrupted at the switch.

Tip-over switches for opening the electric circuit to an electrically operated space heater represents an installation of the type wherein a gravity sensitive actuating member incorporating the features of the present invention is particularly advantageous.

In former tip-over switches, the gravity sensitive actuator has usually been limited to a range of movement established by a fixed pivot. In other switches of this type having a more universal range of action the efficiency of the gravity sensitive actuator was impaired by lack of control over the actuator in certain abnormal positions of the appliance with which the switch was associated.

In accordance with the present invention, a simplified and effective gravity sensitive actuator is provided wherein a weighted hanger has a ball and socket connection with a ball-shaped head fixed to one of the contact arms of the switch via a stem extending from said arm so as to trap the hanger against withdrawal from said ball and socket connection while allowing the hanger to pivot about an axis which is tiltable in opposite vertical directions through an arc of at least 90 degrees.

Other objects and advantages of the present invention will be apparent from the following description in which certain embodiments are set forth.

For a more complete understanding of the invention reference may be had to the accompanying drawing in which—

FIG. 1 illustrates a portable electric space heater having a switch embodying the features of this invention mounted on the top wall thereof.

FIG. 2 is a similar view showing the switch installed on an upright wall of the heater.

FIG. 3 is an enlarged side elevational view showing the relative position of its parts when the switch is in an operative circuit closing position.

FIG. 4 is an end view of the switch shown in FIG. 3.

FIG. 5 is an enlarged side view showing the swtich in an inoperative circuit opened position under control of the gravity sensitive actuator in response to location of the switch in a tilted position.

FIG. 6 is an enlarged view similar to FIG. 3 showing details of the weighted hanger assembly and the ball shaped head with which the hanger has ball and socket connection.

FIG. 7 is a transverse section taken along line 7—7 of FIG. 6.

FIG. 8 is a switch as shown in FIG. 3 except for modifications in the weighted hanger to accomodate a mounting of the switch as shown in FIG. 2.

An electric space heater designated generally by the reference numeral 10 as shown in FIGS. 1 and 2 of the drawings represents an installation in which a switch embodying the present invention is particularly applicable. The heater 10 includes a housing having a pair of upright side walls 11 and 12, a top wall 13 and a bottom wall 14. In FIG. 1 a switch exemplifying one embodiment of the present invention is shown as mounted on the top wall 13 of the heater and in FIG. 2 the same switch is shown as mounted on the side wall 12. As shown in FIG. 3, the switch thus shown in FIGS. 1 and 2 includes an operating shaft 15 having threaded engagement with an internally threaded bushing 16 secured in axial alignment with an opening in a base member 17. The outer surface of the bushing 16 is also threaded for meshing engagement with a nut 18. Accordingly, when the bushing 16 is projected outwardly through an opening in the top wall 13 of the heater 10 as in FIG. 1, or through a similar opening in the side wall 12 as shown in FIG. 2, the nut 18 is adapted to be tightened against the outer surface of the heater wall surrounding the heater wall opening containing the bushing 16 so as to rigidly fix the base member 17 at a selected position within the confines of the walls of the heater.

Reference numerals 19 and 20 designate a pair of flexible contact arms of conductive material. Cooperating contacts 21 and 22 respectively carried by said contact arms are designed to open and close the desired electrical circuit through the switch and the heater by means of terminal connectors 23 and 24 respectively. The ends of the contact arms 19 and 20 most remote from the contacts 21 and 22 are supported in stacked relation on a post or rivet 25 fixed to the base member 17 by means of spacing insulators 26, 27 and 28. A thermally responsive actuating arm 29 is also supported on the rivet 25 between insulating spacer 28 and a head 30 at the end of the rivet 25 facing away from the area occupied by the contact arms 19 and 20. Thus arms 19 and 20 and the actuating arm 29 occupy superposed positions with the arm 19 facing the base member 17 and the arm 20 located between the arm 19 and the arm 29. Contact arm 20 which extends a shorter distance from the rivet than the arm 19 is resiliently biased toward the arm 19 and against an adjustable stop 31 of insulating material. This stop 31 extends through an opening in the contact arm 19 and forms an extension of the end of the operating shaft 15. Because of the threaded engagement of the shaft 15 with the internal threads of the bushing 16, rotation of the shaft via turning of a knob 32 suitably fixed to the outwardly projecting end portion of shaft 15 will cause the insulating stop 31 to be adjusted to a selected axial position to limit movement of the arm 20 in the direction of the arm 19. In the position shown in FIG. 3 the stop 31 is operative to allow the arm 20 to locate its contact 22 in circuit closing engagement with the contact 21 on arm 19. Also, as shown in FIG. 3, while the contacts 21 and 22 are thus in circuit closing engagement, the outboard end of the contact arm 19 is positioned away from the end of an insulating bottom 33 secured to the thermally responsive arm 29. When the ambient temperature is such as to flex the arm 29 to a predetermined extent toward the arm 19, the button 33 engages and moves the arm 19 in a direction away from arm 20 thereby causing the contacts 21 and 22 to become disengaged and interrupting the current flow through the terminals 23 and 24. Upon cooling, the ambient temperature of the arm 29 is reduced whereupon the arm 29 is flexed in a direction to withdraw the button 3 from engagement with the arm 19 allowing the latter through inherent stress, to return to a position wherein the contacts 21 and 22 are re-engaged and the circuit is reclosed via the terminals 23 and 24. Accordingly the temperature at which the arm 29 functions to move the arm 19 in a direction to interrupt the circuit is established by the position of the arm 20 as determined by the adjustment of the operating shaft 15.

Notwithstanding the controls thus provided in the switch mechanism as hereinbefore described, it is desirable to provide means for interrupting the circuit which flows therethrough when the appliance, such as the heater 10, is accidentally upended or tipped over with consequent risk of causing a fire. To this end, the present invention includes gravity sensitive control means which operate to interrupt the circuit so as to avoid fire hazards in the use of portable electric heating appliances when such appliances are in an abnormal position.

In providing such gravity sensitive control means, the present invention features a ball-like head member 34 having a stem or neck 35 extending therefrom which stem is securely fixed to the outboard end of contact arm 20, as shown in FIGS. 3, 5, 6 and 7, with the head member 34 occupying a position within an area opposite the outboard end portion of the contact arm 19. A weighted hanger 36 is provided with an upward extension which defines a mounting hub 37. A central cavity formed in said mounting hub defines a fragmental spherical internal bearing wall section 38 of a contour conforming to the head member 34 with which the rounded surface of the head member 34 facing toward the arm 20 has engagement to form a ball and socket joint about which the mounting hub 37 is rotatable. The cavity in the hub 37 forms the inner limits of an entrance passageway 40 leading to the cavity from the side of the hub 37 facing away from the area containing the arm 20. A slot 41 leading to the cavity from the opposite side of the hub 37 provides a clearway in which the stem 35 of the head member 34 has freedom to move so as to allow the hub to pivot about an axis which is tiltable in a vertical plane containing said stem through an arc of at least 90 degrees. The hub 37 is accordingly operatively assembled with the head member 34 by extending the stem in leading relation to the head member 34 through the slot 41 via the entrance passageway 40 before the stem is fixed in any suitable manner to the contact arm 20. Likewise a collar 42 is secured to the portion of the stem outside the confines of the hub 37 after the hub 37 and the head member 34 are assembled and before the stem is fixed to the contact arm 20. Thereby the head member 34 and the bearing wall section 38 engaged therewith in co-operation with the collar 42 are effective to trap the hub 37 against withdrawal from the ball and socket relationship with the head member 34 so as to assure effective control of the weighted hanger in all positions of the appliance with which the switch is associated.

The outer surface of the hub 37 is provided with a depression defining a seat 43 in which a detent 44 defining a control portion on the area of the contact member 19 facing the hub is adapted to occupy a seated position when the vertical center line of the hanger as shown in FIGS. 3, 4 and 6 is in a predetermined relation to a line projected vertically downwardly from the detent 44 of the contact arm 19. The outer surface of the hub 37 surrounding the seat 43 is of convexly curved spherical contour concentric with the spherical contour of the head member 34 whereby a change in the position of the detent 44 so as to alter the relationship of the vertical center line of said hanger and a line projected vertically downwardly from the detent 44 as shown in FIG. 5, causes the detent 44 to become unseated from seat 43 and the surface of the hub member outside the confines of said seat 43 to exert a camming force against the detent 44 whereby the contact arm 19 is moved away from the arm 20 to consequently separate the contact 21 from the contact 22 and thus interrupt the circuit flowing through the switch. It will be understood that the inherent stress of the arm 20 is operative to bias the arm in the direction of the hub 37 so as to normally hold the detent 44 in the depression 44 as shown in FIGS. 3, 4 and 6 as well as against the hub 37 surrounding the seat 43 as shown in FIG. 5.

FIG. 8 illustrates a hub 45 of modified design wherein a depression defining a seat 46 is provided in the outer surface of the hub in such relation to the detent 44 as to cause the latter to occupy a seated position in seat 46 only when the detent 44 is in horizontally aligned relation to a plane perpendicular to the vertical center line of the hanger.

It will accordingly be understood that in any position of the hanger which will allow the detent 44 to occupy a seated position in the seat provided in the outer surface of the hub 37 facing the contact arm 19 the contacts 21 and 22 will be in engaged relation while the arm 20 is in an adjusted position compatible with holding the contact 21 and 22 in such engaged relation. However, in any tilted position of the stem of the head member 34 through an arc consistent with the clearance afforded by the slot 41 in the hub 37 which is effective to unseat the detent 44 from the seat provided in the outer surface of the hub 37, the hanger in seeking a vertical position will act to move the surface of the hub 37 surrounding the seat and thereby cam the contact arm 19 away from the arm 20 to separate the contacts 21 and 22 and thus interrupt the circuit flowing through the switch.

The hub in the switch as shown in FIG. 3 as well as in the switch shown in FIG. 8 is of non-conductive material such as a molded body of synthetic resinous composition. The weighted hanger portion 36 is preferably a metallic body having an integral upward extension defining a neck 36ª about which an integral shank portion 37ª of the hub 37 is conveniently joined in enclosing relation to the neck 36ª as an incident to the molding of the hub 37.

While the invention as described herein is shown in combination with a switch having a thermal responsive actuating member as commonly used in electric space heaters and the like, it will be apparent that the application of the gravity sensitive means forming the subject of this invention is equally operable in switches in which such thermal responsive means is absent.

The present invention may be embodied in other specific forms without departing from the spirit or essential characteristics thereof. The embodiments contained herein are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A switch having first and second contact members, a resilient arm supporting said first contact member in confronting relation to said second contact member, a base on which said contact arm is secured for bending movement toward and away from the second contact member, a gravity sensitive actuator, means supporting said actuator opposite the surface of the outboard end of said contact arm facing the area occupied by said second contact member whereby said actuator has swinging movement about an axis which is tiltable in a vertical plane through an arc of at least 90 degrees while confined against relative movement axially of said axis, said contact arm having a control portion defined by a predetermined area thereof, a seat defined by a selected portion of the outer surface of said actuator with which said control portion of the contact arm is engageable to allow said contact arm to have its contact member in circuit closing relation to said second contact member, and said actuator having a convexly curved spherically contoured outer surface in surrounding relation to said seat with which said control portion of the contact arm is engaged to hold said contact members apart in response to swinging movement of said actuator.

2. A switch according to claim 1 wherein said predetermined area of the contact arm is defined by a detent and said seat on the actuator is defined by a depression in its outer surface.

3. A switch according to claim 1 wherein means supporting said actuator includes a second resilient contact arm on which said second contact member is carried.

4. A switch according to claim 1 wherein a second resilient contact arm supports said second contact member, and said means supporting said actuator includes a ball-like head having a stem extending therefrom which is fixed to said second resilient contact arm, and said actuator has a ball and socket connection with said head.

5. A switch according to claim 1 wherein a second resilient contact arm supports said second contact member, said actuator includes a weighted hanger having a mounting hub provided with a cavity defining a fragmental spherical internal bearing wall, and means supporting said actuator includes a ball-like head having a stem extending therefrom which is fixed to said second resilient contact arm, said head having the surface thereof facing in the direction of said second contact arm in engagement with said bearing wall of the mounting hub to define a ball and socket joint between said head and said mounting hub of the actuator.

6. A switch according to claim 1 wherein a thermal responsive member secured to said support is operative to flex said contact arm supporting said first contact member in a direction to separate said contact members while said predetermined area of said contact arm occupies a position in vertical alignment with the vertical center line of said actuator.

7. A switch according to claim 1 wherein said actuator includes a metallic weighted hanger and the surface of the actuator with which the contact arm supporting said first contact member is engaged is defined by a mounting hub of insulating material.

8. A switch according to claim 1 wherein said actuator includes a metallic weighted hanger having an upward extension defining a neck and the surface of the actuator with which the contact arm supporting said first contact member is engaged is defined by a mounting hub of molded insulating material in which the neck of said weighted hanger is embedded.

9. A switch according to claim 1 wherein said actuator includes a weighted hanger and the surface of the actuator with which the contact arm supporting said first contact member is engaged is defined by a mounting hub of insulating material, said hub having a passageway therethrough, said passageway having a portion thereof defining a semi-spherical bearing wall, and said means supporting said actuator includes a ball like head having a stem extending therefrom which is fixed to a second resilient contact arm carrying said second contact member, and said head has the surface thereof facing in the direction of said second contact arm in engagement with said bearing wall of the mounting hub to define a ball and socket joint between said head and said mounting hub of the actuator.

10. A switch according to claim 1 wherein a thermal responsive member secured to said support is operative to flex said contact arm supporting said first contact member in a direction to separate said contact members while said predetermined area of said contact arm occupies a position in vertical alignment with the vertical center line of said actuator, a second resilient contact arm supporting said second contact member, and means operative to limit movement of said second contact arm toward said first contact arm includes an operating shaft mounted on said base for relative axial adjustment toward and away from the area occupied by said second contact arm.

References Cited
UNITED STATES PATENTS

| | | | |
|---|---|---|---|
| 3,175,059 | 3/1965 | Chesnut | 200—61.52 |
| 3,201,548 | 8/1965 | Mertler | 337—355 |
| 3,271,546 | 9/1966 | Chesnut | 200—61.52 |

BERNARD A. GILHEANY, *Primary Examiner.*

R. L. COHRS, *Assistant Examiner.*

U.S. Cl. X.R.

200—61.52; 337—349, 355